United States Patent
Jang et al.

(10) Patent No.: US 10,767,038 B2
(45) Date of Patent: Sep. 8, 2020

(54) RUBBER MODIFIED VINYL-BASED GRAFT COPOLYMER, AND THERMOPLASTIC RESIN COMPOSITION CONTAINING SAME

(71) Applicant: LOTTE ADVANCED MATERIALS CO., LTD., Yeosu-si (KR)

(72) Inventors: Joo Hyun Jang, Uiwang-si (KR); Yu Jin Jung, Uiwang-si (KR); Ki Bo Chang, Uiwang-si (KR); Jeong Tae Kim, Uiwang-si (KR); Kwang Soo Park, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 142 days.

(21) Appl. No.: 15/766,927

(22) PCT Filed: Dec. 13, 2016

(86) PCT No.: PCT/KR2016/014602
§ 371 (c)(1),
(2) Date: Apr. 9, 2018

(87) PCT Pub. No.: WO2017/116042
PCT Pub. Date: Jul. 6, 2017

(65) Prior Publication Data
US 2018/0298184 A1    Oct. 18, 2018

(30) Foreign Application Priority Data

Dec. 31, 2015 (KR) .................. 10-2015-0191439

(51) Int. Cl.
| | | |
|---|---|---|
| *C08L 51/04* | (2006.01) | |
| *C08F 279/04* | (2006.01) | |
| *C08L 25/12* | (2006.01) | |
| *C08F 226/00* | (2006.01) | |
| *C08L 9/02* | (2006.01) | |

(52) U.S. Cl.
CPC ............ *C08L 51/04* (2013.01); *C08F 226/00* (2013.01); *C08F 279/04* (2013.01); *C08L 9/02* (2013.01); *C08L 25/12* (2013.01); *C08F 2500/12* (2013.01); *C08L 2205/025* (2013.01); *C08L 2205/035* (2013.01); *C08L 2207/04* (2013.01); *C08L 2207/53* (2013.01)

(58) Field of Classification Search
CPC ........ C08F 22/40; C08F 222/40; C08F 12/40; C08F 212/40
See application file for complete search history.

(56) References Cited

U.S. PATENT DOCUMENTS

| | | | |
|---|---|---|---|
| 4,757,109 A | | 7/1988 | Kishida et al. |
| 4,774,287 A | * | 9/1988 | Shimozato ............ C08F 212/12 525/70 |
| 5,112,895 A | * | 5/1992 | Chen ....................... C08L 25/12 524/308 |
| 5,412,036 A | | 5/1995 | Traugott et al. |
| 5,446,103 A | * | 8/1995 | Traugott ............... C08F 279/04 525/282 |
| 5,948,879 A | | 9/1999 | Mori et al. |
| 6,774,166 B1 | * | 8/2004 | Eichenauer ............. C08K 5/01 524/231 |
| 7,638,559 B2 | | 12/2009 | Petela et al. |
| 7,947,751 B2 | | 5/2011 | Petela et al. |
| 2006/0116472 A1 | | 6/2006 | Staratschek et al. |
| 2010/0168333 A1 | | 7/2010 | Hong et al. |

FOREIGN PATENT DOCUMENTS

| | | |
|---|---|---|
| CN | 85103737 A | 2/1987 |
| CN | 86106270 A | 3/1987 |
| CN | 1133601 A | 10/1996 |
| CN | 1081196 C | 3/2002 |
| CN | 1357557 A | 7/2002 |
| CN | 1196737 C | 4/2005 |
| CN | 1702114 A | 11/2005 |
| CN | 1935867 A | 3/2007 |
| CN | 101287781 A | 10/2008 |
| CN | 101768317 A | 7/2010 |
| JP | 60-258217 A | 12/1985 |
| JP | 6-228422 A | 8/1994 |

(Continued)

OTHER PUBLICATIONS

International Search Report in counterpart International Application No. PCT/KR2016/014602 dated Mar. 17, 2017, pp. 1-4.

(Continued)

*Primary Examiner* — Mark S Kaucher
(74) *Attorney, Agent, or Firm* — Additon, Higgins & Pendleton, P.A.

(57) ABSTRACT

A rubber modified vinyl-based graft copolymer of the present invention has a core-shell structure in which a shell is formed by graft-polymerizing a monomer mixture to a core comprising a rubbery polymer, wherein the monomer mixture comprises: an aromatic monomer comprising an α-substituted aromatic vinyl-based monomer represented by chemical formula 1 and an aromatic vinyl-based monomer excluding the α-substituted aromatic vinyl-based monomer; a cyanovinyl-based monomer; and a maleimide-based monomer. A thermoplastic resin composition containing the rubber modified vinyl-based graft copolymer has excellent impact resistance, heat resistance, appearance characteristics and the like.

8 Claims, No Drawings

(56) References Cited

FOREIGN PATENT DOCUMENTS

| JP | 2002-317015 A | 10/2002 |
|---|---|---|
| JP | 2003-502469 A | 1/2003 |
| KR | 10-1998-0080949 A | 11/1998 |
| KR | 10-2003-0030422 A | 4/2003 |
| KR | 10-2003-0052525 A | 6/2003 |
| KR | 10-2003-0056475 A | 7/2003 |
| KR | 10-2006-0047874 A | 5/2006 |
| WO | 2017/116042 A1 | 7/2017 |

OTHER PUBLICATIONS

Office Action in counterpart Chinese Application No. 201680072889.1 dated Dec. 27, 2019, pp. 1-11.
Institute of Science and Technology Information, Ministry of Chemical Industry, World Fine Chemicals Handbook, p. 454 (Dec. 30, 1982) 3 pages [With English Abstract].
Chemical Industry Press, Rubber and Plastic Processing Aid, p. 303 (Sep. 30, 2004) 5 pages [With English Abstract].
China Supplies Press, Synthetic Resin New Information Brochure, p. 308 (May 31, 2002) 4 pages [With English Abstract].
Office Action in counterpart Japanese Application No. 2018-517795 dated Jun. 30, 2020, pp. 1-3.

* cited by examiner

RUBBER MODIFIED VINYL-BASED GRAFT COPOLYMER, AND THERMOPLASTIC RESIN COMPOSITION CONTAINING SAME

CROSS-REFERENCE TO RELATED APPLICATIONS

This application claims priority to and the benefit of International Application No. PCT/KR2016/014602, filed Dec. 13, 2016, which published as WO 2017/116042 on Jul. 6, 2017; and Korean Patent Application No. 10-2015-0191439, filed in the Korean Intellectual Property Office on Dec. 31, 2015, the entire disclosure of each of which is incorporated herein by reference.

TECHNICAL FIELD

The present invention relates to a rubber-modified vinyl-based graft copolymer and a thermoplastic resin composition containing the same. More particularly, the present invention relates to a rubber-modified vinyl-based graft copolymer having good properties in terms of impact resistance, thermal resistance and external appearance, a method of preparing the same, and a thermoplastic resin composition containing the same.

BACKGROUND ART

A rubber-modified vinyl-based graft copolymer resin such as acrylonitrile-butadiene-styrene (ABS) has good properties in terms of impact resistance, moldability, external appearance, and the like, and is broadly used in various fields including automobile components, electric/electronic products, office machinery, and the like.

In order to allow such a rubber-modified vinyl-based graft copolymer resin to be applied to interior/exterior materials for automobile components and electric/electronic products, the rubber-modified vinyl-based graft copolymer resin is required to exhibit good thermal resistance. In order to improve thermal resistance of the rubber-modified vinyl-based graft copolymer resin, a method of replacing part of components constituting the rubber-modified vinyl-based graft copolymer resin by a heat resistant copolymer has been developed. For example, a molded product produced by melt extrusion of a rubber-modified vinyl-based graft copolymer such as g-ABS together with a heat-resistant copolymer such as α-methylstyrene-styrene-acrylonitrile (AMS-SAN) and N-phenyl maleimide-styrene-acrylonitrile (PMI-SAN) is used.

However, the heat-resistant copolymer can cause problems such as gas generation due to depolymerization of α-methylstyrene and degradation in external appearance due to non-melting of N-phenyl maleimide, and exhibits low compatibility with the rubber-modified vinyl-based graft copolymer such as g-ABS, thereby causing deterioration and deviation in properties such as impact resistance and the like.

Therefore, there is a need for development of a rubber-modified vinyl-based graft copolymer, which can overcome problems caused by the heat-resistant copolymer and exhibit good properties in terms of impact resistance, thermal resistance and external appearance, and a thermoplastic resin composition including the same.

The background technique of the present invention is disclosed in U.S. Pat. No. 4,757,109 and the like.

DISCLOSURE

Technical Problem

It is one object of the present invention to provide a rubber-modified vinyl-based graft copolymer capable of realizing good properties in terms of impact resistance, thermal resistance and external appearance, and a method of preparing the same.

It is another object of the present invention to provide a thermoplastic resin composition that includes the rubber-modified vinyl-based graft copolymer and exhibits good properties in terms of impact resistance, thermal resistance, external appearance, and the like.

The above and other objects of the present invention can be achieved by the present invention described below.

Technical Solution

One aspect of the present invention relates to a rubber-modified vinyl-based graft copolymer. The rubber-modified vinyl-based graft copolymer has a core-shell structure in which a shell is formed by graft polymerization of a monomer mixture to a core including a rubber polymer, wherein the monomer mixture includes: an aromatic monomer including an alpha position-substituted aromatic vinyl-based monomer represented by Formula 1 and an aromatic vinyl-based monomer other than the alpha position-substituted aromatic vinyl-based monomer; a vinyl cyanide-based monomer; and a maleimide-based monomer:

[Formula 1]

where $R_1$ is a $C_1$ to $C_5$ alkyl group and Ar is a substituted or unsubstituted $C_6$ to $C_{20}$ aryl group or a substituted or unsubstituted $C_7$ to $C_{20}$ alkylaryl group.

In some embodiments, the rubber-modified vinyl-based graft copolymer may be prepared by graft copolymerization of about 60 to about 160 parts by weight of the shell relative to about 100 parts by weight of the core.

In some embodiments, the monomer mixture may include about 30 wt % to about 80 wt % of the aromatic monomer, about 10 wt % to about 30 wt % of the vinyl cyanide-based monomer, and about 10 wt % to about 30 wt % of the maleimide-based monomer.

In some embodiments, the alpha position-substituted aromatic vinyl-based monomer and the aromatic vinyl-based monomer other than the alpha position-substituted aromatic vinyl-based monomer may be present in a weight ratio of about 0.5:1 to about 5:1.

In some embodiments, the rubber polymer may have an average particle diameter of about 200 nm to about 400 nm.

In some embodiments, the core may be formed by polymerization of an aromatic monomer and a vinyl cyanide-based monomer swollen into the rubber polymer.

In some embodiments, the core may be formed by polymerization of about 10 to about 110 parts by weight of the aromatic monomer and the vinyl cyanide-based monomer relative to about 100 parts by weight of the rubber polymer, and the aromatic monomer and the vinyl cyanide-based monomer may be present in a weight ratio of about 1.5:1 to about 4:1.

In some embodiments, the maleimide-based monomer may include a compound represented by Formula 2:

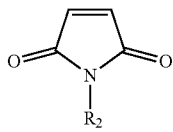

[Formula 2]

where $R_2$ is a $C_1$ to $C_{20}$ hydrocarbon group.

Another aspect of the present invention relates to a method of preparing the rubber-modified vinyl-based graft copolymer. The preparation method may include graft-polymerizing a monomer mixture to a core including a rubber polymer, wherein the monomer mixture includes an aromatic monomer including an alpha position-substituted aromatic vinyl-based monomer represented by Formula 1 and an aromatic vinyl-based monomer other than the alpha position-substituted aromatic vinyl-based monomer, a vinyl cyanide-based monomer, and a maleimide-based monomer.

In some embodiments, the core may be formed by adding a mixture of an aromatic monomer, a vinyl cyanide-based monomer, and a polymerization initiator to the rubber polymer, followed by stirring the mixture and the rubber polymer in the presence of an emulsifier, a molecular weight regulator and water such that the aromatic monomer and the vinyl cyanide-based monomer are swollen into the rubber polymer; and polymerizing the aromatic monomer and the vinyl cyanide-based monomer swollen into the rubber polymer.

A further aspect of the present invention relates to a thermoplastic resin composition. The thermoplastic resin composition includes the rubber-modified vinyl-based graft copolymer; and an aromatic vinyl-based copolymer resin.

In some embodiments, the thermoplastic resin composition may include about 10 wt % to about 40 wt % of the rubber-modified vinyl-based graft copolymer and about 60 wt % to about 90 wt % of the aromatic vinyl-based copolymer resin.

In some embodiments, the aromatic vinyl-based copolymer resin may include at least one of a copolymer of an aromatic monomer and a vinyl cyanide-based monomer; a copolymer of a vinyl cyanide-based monomer and an aromatic monomer comprising an alpha position-substituted aromatic vinyl-based monomer and an aromatic vinyl-based monomer other than the alpha position-substituted aromatic vinyl-based monomer; and a copolymer of an aromatic monomer, a vinyl cyanide-based monomer, and a maleimide-based monomer.

In some embodiments, the thermoplastic resin composition may have an Izod impact strength of about 20 kgf·cm/cm to about 40 kgf·cm/cm, as measured on a ¼" thick specimen in accordance with ASTM D256, a melt-flow index of about 3 g/10 min to about 5 g/10 min, as measured at 200° C. under a load of 10 kg in accordance with ISO 1133, and a Vicat softening temperature (VST) of about 110° C. to about 130° C., as measured under a load of 5 kg in accordance with ASTM D1525.

Advantageous Effects

The present invention provides a rubber-modified vinyl-based graft copolymer capable of realizing good properties in terms of impact resistance, thermal resistance and external appearance, a method of preparing the same, and a thermoplastic resin composition that includes the rubber-modified vinyl-based graft copolymer and exhibits good properties in terms of impact resistance, thermal resistance, external appearance, and the like.

BEST MODE

Hereinafter, embodiments of the present invention will be described in detail.

A rubber-modified vinyl-based graft copolymer according to the present invention has a core-shell structure in which the shell is formed by graft polymerization of a monomer mixture to (A) a core including (a1) a rubber polymer, wherein the monomer mixture includes (b) an aromatic monomer including (b1) an alpha position-substituted aromatic vinyl-based monomer and (b2) an aromatic vinyl-based monomer other than the alpha position-substituted aromatic vinyl-based monomer; (c) a vinyl cyanide-based monomer; and (d) a maleimide-based monomer.

(A) Core

According to one embodiment, the core may include the rubber polymer (a1), which is used in a typical rubber-modified vinyl-based graft copolymer.

In some embodiments, the rubber polymer (a1) may include diene rubbers such as polybutadiene, poly(styrene-butadiene), and poly(acrylonitrile-butadiene); saturated rubbers obtained by adding hydrogen to the diene rubbers; isoprene rubbers; acrylic rubbers such as poly(butyl acrylate); and ethylene-propylene-diene monomer terpolymer (EPDM). These may be used alone or as a mixture thereof. For example, the rubber polymer may be a polybutadiene (PBD) rubber.

In some embodiments, the rubber polymer may have an average (Z-average) particle diameter of about 200 nm to about 400 nm, for example, about 230 nm to about 350 nm. Within this range of the average particle diameter, the rubber polymer can secure good polymerization efficiency upon graft polymerization and it is possible to obtain a rubber-modified vinyl-based graft copolymer capable of realizing good properties in terms of impact resistance and appearance.

In some embodiments, the core (A) may be composed of the rubber polymer (a1) alone, or may be formed by polymerizing an aromatic monomer (aromatic vinyl-based monomer) (a2) and a vinyl cyanide-based monomer (a3) swollen into the rubber polymer (a1). The core obtained by polymerizing the aromatic monomer and the vinyl cyanide-based monomer swollen into the rubber polymer (a1) may be prepared by, for example, adding a mixture of the aromatic monomer, the vinyl cyanide-based monomer, and a polymerization initiator to the rubber polymer, followed by stirring the mixture and the rubber polymer in the presence of an emulsifier, a molecular weight regulator and water such that the aromatic monomer and the vinyl cyanide-based monomer are swollen into the rubber polymer; and polymerizing the aromatic monomer and the vinyl cyanide-based monomer swollen into the rubber polymer, without being limited thereto. Such a method of forming the core is well known in the art and can be easily performed by those skilled in the art.

Examples of the aromatic monomer (a2) may include styrene, α-methylstyrene, β-methylstyrene, p-methylstyrene, p-t-butylstyrene, ethylstyrene, vinylxylene, monochlorostyrene, dichlorostyrene, dibromostyrene, and vinyl naphthalene, without being limited thereto. These may be used alone or as a mixture thereof. Preferably, styrene is used as the aromatic monomer (a2).

Examples of the vinyl cyanide-based monomer (a3) may include acrylonitrile, methacrylonitrile, and ethacrylonitrile, without being limited thereto. These may be used alone or as a mixture thereof. Specifically, acrylonitrile may be used as the vinyl cyanide-based monomer (a3).

In some embodiments, in the core (A) obtained by polymerizing the aromatic monomer (a2) and the vinyl cyanide-based monomer (a3) swollen into the rubber polymer (a1), the aromatic monomer (a2) and the vinyl cyanide-based monomer (a3) may be present in an amount of about 10 to about 110 parts by weight, for example, about 15 to about 106 parts by weight, relative to about 100 parts by weight of the rubber polymer (a1). In addition, the aromatic monomer (a2) and the vinyl cyanide-based monomer (a3) may be present in a weight ratio (a2:a3) of about 1.5:1 to about 4:1, for example, about 2:1 to about 3.5:1. Within this range, it is possible to obtain a rubber-modified vinyl-based graft copolymer capable of realizing good impact resistance.

(B) Shell

According to the present invention, the shell is formed by graft polymerization of the monomer mixture to the core (A), in which the monomer mixture includes the aromatic monomer (b) including the alpha position-substituted aromatic vinyl-based monomer (b1) and the aromatic vinyl-based monomer (b2) other than the alpha position-substituted aromatic vinyl-based monomer; the vinyl cyanide-based monomer (c); and the maleimide-based monomer (d). In the rubber-modified vinyl-based graft copolymer according to the present invention, the shell is composed of four or more components b1, b2, c, d, thereby realizing good properties in terms of impact resistance, thermal resistance and external appearance when applied to a thermoplastic resin composition without suffering from problems such as property deterioration due to use of a heat-resistant copolymer (matrix resin).

In some embodiments, the alpha position-substituted aromatic vinyl-based monomer (b1) may be represented by Formula 1.

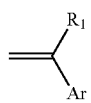

[Formula 1]

In Formula 1, $R_1$ is a $C_1$ to $C_5$ alkyl group, for example, a methyl group, an ethyl group, and a propyl group, and Ar is a substituted or unsubstituted $C_6$ to $C_{20}$ aryl group or a substituted or unsubstituted $C_7$ to $C_{20}$ alkylaryl group. Herein, the term 'substituted' means that a hydrogen atom is substituted by a $C_1$ to $C_{10}$ alkyl group, a halogen atom, a nitro group, a cyano group, a hydroxy group, an amino group, a $C_6$ to $C_{10}$ aryl group, a $C_3$ to $C_{10}$ cycloalkyl group, a $C_3$ to $C_{10}$ heterocycloalkyl group, a $C_4$ to $C_{10}$ heteroaryl group, or a combination thereof. Examples of Ar may include a phenyl group, a benzyl group, a halophenyl group, a naphthyl group, and the like. Examples of the alpha position-substituted aromatic vinyl-based monomer may include α-methylstyrene and α-ethylstyrene, without being limited thereto.

In some embodiments, the aromatic vinyl-based monomer (b2) other than the alpha position-substituted aromatic vinyl-based monomer may be selected from any aromatic vinyl-based monomers used for a typical rubber-modified vinyl-based graft copolymer excluding the alpha position-substituted aromatic vinyl-based monomer. For example, the aromatic vinyl-based monomer (b2) other than the alpha position-substituted aromatic vinyl-based monomer may include styrene, β-methylstyrene, p-methylstyrene, p-t-butylstyrene, ethylstyrene, vinylxylene, monochlorostyrene, dichlorostyrene, dibromostyrene, and vinyl naphthalene, without being limited thereto. These may be used alone or as a mixture thereof. Specifically, styrene may be used as the aromatic vinyl-based monomer other than the alpha position-substituted aromatic vinyl-based monomer.

In some embodiments, the aromatic monomer (b) may be present in an amount of about 30 wt % to about 80 wt %, for example, about 35 wt % to about 75 wt %, based on 100 wt % of the monomer mixture. In addition, the alpha position-substituted aromatic vinyl-based monomer (b1) and the aromatic vinyl-based monomer (b2) other than the alpha position-substituted aromatic vinyl-based monomer may be present in a weight ratio (b1:b2) of about 0.5:1 to about 5:1, for example, about 1:1 to about 3:1. Within this range, the rubber-modified vinyl-based graft copolymer capable of realizing good properties in terms of impact resistance, thermal resistance and external appearance can be economically obtained.

In some embodiments, the vinyl cyanide-based monomer (c) may be selected from any vinyl cyanide-based monomer used for a typical rubber-modified vinyl-based graft copolymer. For example, the vinyl cyanide-based monomer (c) may include acrylonitrile, methacrylonitrile, ethacrylonitrile, phenylacrylonitrile, α-chloroacrylonitrile, and fumaronitrile, without being limited thereto. These may be used alone or as a mixture thereof. Specifically, acrylonitrile may be used as the vinyl cyanide-based monomer.

In some embodiments, the vinyl cyanide-based monomer (c) may be present in an amount of about 10 wt % to about 30 wt %, for example, about 15 wt % to about 25 wt %, based on 100 wt % of the monomer mixture. Within this range, it is possible to obtain a rubber-modified vinyl-based graft copolymer capable of realizing good properties in terms of thermal resistance, impact resistance, and external appearance.

In some embodiments, the maleimide-based monomer (d) may include an N-substituted maleimide compound represented by Formula 2.

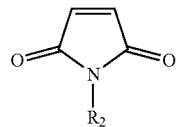

[Formula 2]

In Formula 2, $R_2$ is a $C_1$ to $C_{20}$ hydrocarbon group, for example, a $C_1$ to $C_{20}$ alkyl group or a $C_6$ to $C_{20}$ aryl group, specifically a methyl group, an ethyl group, a propyl group, a cyclohexyl group, or a phenyl group. Examples of the maleimide-based monomer may include N-phenyl maleimide (PMI) and N-methyl maleimide, without being limited thereto.

In some embodiments, the maleimide-based monomer (d) may be present in an amount of about 10 wt % to about 30 wt %, for example, about 15 wt % to about 25 wt %, based on 100 wt % of the monomer mixture. Within this range, graft polymerization of the shell components can be performed at a high rate with high efficiency and it is possible to obtain a rubber-modified vinyl-based graft copolymer capable of realizing good properties in terms of thermal resistance, impact resistance, and external appearance.

In some embodiments, the rubber-modified vinyl-based graft copolymer may be obtained by graft polymerization of about 60 to about 160 parts by weight of the shell components (including b1, b2, c and d), for example, about 65 to about 150 parts by weight of the shell components, to about 100 parts by weight of the core. Within this range it is possible to obtain a rubber-modified vinyl-based graft copolymer capable of realizing good properties in terms of impact resistance, thermal resistance and external appearance.

A method of preparing the rubber-modified vinyl-based graft copolymer according to the embodiment of the invention may include performing graft polymerization of the monomer mixture including the aromatic monomer (b), the vinyl cyanide-based monomer (c) and the maleimide-based monomer (d) to the core (A). The polymerization may be performed by any typical polymerization method known in the art, such as emulsion polymerization, suspension polymerization, and bulk polymerization.

In some embodiments, the polymerization may be carried out by an emulsion polymerization process known in the art in the presence of water (deionized water), a polymerization initiator, an emulsifier, a molecular weight regulator, and the like at a temperature of about 45° C. to about 80° C. for about 1 hour to about 10 hours, for example, for about 1 hour to about 5 hours. By application of the shell components to provide high polymerization efficiency, the rubber-modified vinyl-based graft copolymer can be prepared in high yield in a shorter polymerization time than a typical rubber-modified vinyl-based graft copolymer.

Examples of the polymerization initiator may include peroxide initiators, such as benzoyl peroxide, t-butyl hydroperoxide, cumene hydroperoxide, diisopropylbenzene hydroxide peroxide, t-butylperoxylaurate, t-butylperoxyacetate, and t-butylperoxypropylcaponate; a redox-type initiator combined with an oxidation-reduction agent; and combinations thereof, without being limited thereto.

Examples of the emulsifier may include a soap compound of fatty acid, a soap compound of rosin acid, an acrylic acid copolymer of acrylate saponified with sodium hydroxide, a sulfate salt of polyoxyethylene allylglycidylnonylphenyl ether, an alkyl aryl sulfonate, alkali methyl alkyl sulfates, sulfonated alkyl esters, and combinations thereof, without being limited thereto.

Examples of the molecular weight regulator may include tert-dodecylmercaptan, bis(isopropoxythiocarbonyl)disulfide, p-methoxyphenyldiazothio-2-naphthyl ether, and combinations thereof, without being limited thereto.

In some embodiments, when the core (A) is obtained through polymerization of the aromatic monomer (a2) and the vinyl cyanide-based monomer (a3) swollen into the rubber polymer (a1), the rubber-modified vinyl-based graft copolymer may be prepared by adding a mixture of the aromatic monomer (a2), the vinyl cyanide-based monomer (a3) and the polymerization initiator to the rubber polymer (a1), followed by stirring the mixture and the rubber polymer in the presence of an emulsifier, a molecular weight regulator and water such that the aromatic monomer and the vinyl cyanide-based monomer are swollen into the rubber polymer, followed by polymerizing the aromatic monomer and the vinyl cyanide-based monomer swollen into the rubber polymer (swelling polymerization) to form the core; adding the monomer mixture (including the components b1, b2, c and d) and, as needed, the polymerization initiator, the molecular weight regulator, and the like to the core to perform graft polymerization of the monomer mixture to the core.

In some embodiments, the rubber-modified vinyl-based graft copolymer may be obtained in the form of a powdered polymer by adding a sulfuric acid solution to the resulting polymer to depolymerize the polymer in a latex phase after completion of graft polymerization, followed by washing and drying the resulting compound.

A thermoplastic resin composition according to the present invention includes the rubber-modified vinyl-based graft copolymer; and an aromatic vinyl-based copolymer resin. In the thermoplastic resin composition, the rubber-modified vinyl-based graft copolymer may be present in a dispersed state in the aromatic vinyl-based copolymer resin (matrix resin).

In some embodiments, the aromatic vinyl-based copolymer resin may be an aromatic vinyl-based copolymer resin used for a typical rubber-modified vinyl-based graft copolymer resin. For example, the aromatic vinyl-based copolymer resin may be a copolymer of a monomer mixture including an aromatic vinyl-based monomer and a monomer copolymerizable with an aromatic vinyl-based monomer such as a vinyl cyanide-based monomer.

In some embodiments, the aromatic vinyl-based copolymer resin may be obtained by mixing the aromatic vinyl-based monomer and the monomer copolymerizable with the aromatic vinyl-based monomer, followed by polymerizing the monomer mixture. Polymerization may be performed by any typical polymerization method known in the art, such as emulsion polymerization, suspension polymerization, and bulk polymerization.

In some embodiments, the aromatic vinyl-based monomer may include, for example, styrene, α-methylstyrene, β-methylstyrene, p-methylstyrene, p-t-butylstyrene, ethylstyrene, vinylxylene, monochlorostyrene, dichlorostyrene, dibromostyrene, and vinyl naphthalene, without being limited thereto. These may be used alone or as a mixture thereof. The aromatic vinyl-based monomer may be present in an amount of about 20 wt % to about 90 wt %, for example, about 30 wt % to about 80 wt %, based on 100 wt % of the aromatic vinyl-based copolymer resin. Within this range, the thermoplastic resin composition can exhibit good properties in terms of impact resistance, flowability, and the like.

In some embodiments, the monomer copolymerizable with the aromatic vinyl-based monomer may include at least one of, for example, a vinyl cyanide-based monomer, such as acrylonitrile, methacrylonitrile, ethacrylonitrile, phenylacrylonitrile, α-chloroacrylonitrile, and fumaronitrile; a maleimide-based monomer, such as N-phenyl maleimide (PMI), N-methyl maleimide, and the like; and a mixture thereof. The monomer copolymerizable with the aromatic vinyl-based monomer may be present in an amount of about 10 wt % to about 80 wt %, for example, about 20 wt % to about 70 wt %, based on 100 wt % of the aromatic vinyl-based copolymer resin. Within this range, the thermoplastic resin composition can exhibit good properties in terms of impact resistance, flowability, and the like.

In some embodiments, the aromatic vinyl-based copolymer resin may include at least one copolymer selected from among a copolymer of about 20 wt % to about 90 wt %, for example, about 30 to about 80 wt %, of the aromatic vinyl-based monomer (b), and about 10 wt % to about 80 wt %, for example, about 20 wt % to about 70 wt %, of the vinyl cyanide-based monomer (c); a terpolymer of about 15 wt % to about 55 wt %, for example, about 20 wt % to about 50 wt %, of the alpha position-substituted aromatic vinyl-based monomer (b1), about 5 wt % to about 35 wt %, for example, about 10 wt % to about 30 wt %, of the aromatic vinyl-based monomer (b2) other than the alpha position-substituted aromatic vinyl-based monomer, and about 10 wt % to about 80 wt %, for example, about 20 wt % to about 70 wt %, of the vinyl cyanide-based monomer (c); and a terpolymer of about 20 wt % to about 90 wt %, for example, about 30 wt % to about 80 wt %, of the aromatic vinyl-based monomer (b), about 5 wt % to about 70 wt %, for example, about 10 wt % to about 60 wt % of the vinyl cyanide-based monomer (c), and about 5 wt % to about 70 wt %, for example, about 10 wt % to about 60 wt % of the maleimide-based monomer (d). For example, the aromatic vinyl-based copolymer resin may include about 10 wt % to about 90 wt %, for example, about 20 wt % to about 80 wt % of styrene-acrylonitrile (SAN) copolymer, about 5 wt % to about 50 wt %, for example, about 10 wt % to about 40 wt %, of α-methylstyrene-styrene-acrylonitrile (AMS-SAN) copolymer, and about 5 wt % to about 50 wt %, for example, about 10 wt % to about 40 wt %, of N-phenylimide-styrene-acrylonitrile (PMI-SAN) copolymer. Within this range, the thermoplastic resin composition can exhibit good properties in terms of impact resistance, flowability, and the like.

In some embodiments, the aromatic vinyl-based copolymer resin may have a weight average molecular weight (Mw) of about 10,000 g/mol to about 300,000 g/mol, for example, about 15,000 g/mol to about 160,000 g/mol, as measured by gel permeation chromatography (GPC). Within this range, the thermoplastic resin composition can exhibit good properties in terms of impact resistance, heat resistance, flowability (processability), external appearance, and the like.

In some embodiments, the thermoplastic resin composition may include about 10 wt % to about 40 wt %, for example, about 15 to about 35 wt %, of the rubber-modified vinyl-based graft copolymer and about 60 wt % to about 90 wt %, for example, about 65 wt % to about 85 wt % of the aromatic vinyl-based copolymer resin. Within this range, the thermoplastic resin composition can exhibit good properties in terms of impact resistance, heat resistance, flowability (processability), external appearance, and the like.

In some embodiments, the thermoplastic resin composition may further include typical additives, as needed. Examples of the additives may include flame retardants, antioxidants, anti-dripping agents, lubricants, release agents, nucleating agents, antistatic agents, stabilizers, pigments, dyes, and mixtures thereof, without being limited thereto. The additive may be present in an amount of about 0.001 to about 20 parts by weight relative to about 100 parts by weight of base resins including the rubber-modified vinyl-based graft copolymer and the aromatic vinyl-based copolymer resin, without being limited thereto.

In some embodiments, the thermoplastic resin composition may be prepared by any known method of preparing a thermoplastic resin composition. For example, the aforementioned components and, optionally, other additives are mixed, followed by melt extrusion in an extruder, thereby preparing a thermoplastic resin composition in pellet form. The prepared pellets may be produced into various molded products (products) by various molding methods, such as injection molding, extrusion molding, vacuum molding, and casting. Such molding methods are well known to those skilled in the art. The thermoplastic resin composition according to the present invention exhibits good properties in terms of impact resistance, flowability (processability), external appearance, and the like, and thus may be used in various fields such as interior/exterior materials for automobile parts, electric/electronic products, and the like.

The thermoplastic resin composition may have an Izod impact strength of about 20 kgf·cm/cm to about 40 kgf·cm/cm, for example, about 20 kgf·cm/cm to about 35 kgf·cm/cm, as measured on a ¼" thick specimen in accordance with ASTM D256, a melt-flow index of about 3 g/10 min to about 5 g/10 min, for example, about 3.5 g/10 min to about 4.5 g/10 min, as measured at 200° C. under a load of 10 kg in accordance with ISO 1133, and a Vicat softening temperature (VST) of about 110° C. to about 130° C., for example, about 112° C. to about 125° C., as measured under a load of 5 kg in accordance with ASTM D1525.

MODE FOR INVENTION

Next, the present invention will be described in more detail with reference to some examples. It should be understood that these examples are provided for illustration only and are not to be in any way construed as limiting the present invention.

EXAMPLE

Preparative Examples 1 to 8: Preparation of Rubber-Modified Vinyl-Based Graft Copolymer After (a1) butadiene rubber (PBD), (a2) styrene (SM) and (a3) acrylonitrile (AN) were placed in amounts as listed in Table 1 in a glass reactor, relative to 100 parts by weight of the butadiene rubber, 150 parts by weight of deionized water, 0.1 parts by weight of cumene hydroperoxide as a peroxide initiator, 0.2 parts by weight of dextrose monohydrate as a reduction agent, 0.5 parts by weight of rosin soap as an emulsifier, and 0.1 parts by weight of tert-dodecyl mercaptan as a molecular weight regulator were added to the reactor. Then, after the reactor was heated to a temperature of 60° C., ferric oxide hydrate and sodium pyrophosphate decahydrate were added as redox initiators to the reactor, followed by polymerizing styrene and acrylonitrile swollen in the butadiene rubber for 1 hour to form a core.

Next, (b1) α-methylstyrene (AMS), (b2) styrene (SM), (b3) acrylonitrile (AN), and (b4) N-phenyl maleimide (PMI) were slowly added in amounts as listed in Table 1 to the glass reactor together with 0.2 parts by weight of cumene hydroperoxide as a polymerization initiator and 0.2 parts by weight of tert-dodecyl mercaptan as a molecular weight regulator relative to 100 parts by weight of the core, followed by graft polymerization at 60° C. for 3 hours. After completion of polymerization, the resulting polymer was added to a 1% sulfuric acid solution at 75° C. to depolymerize the polymer in a latex phase, followed by washing and drying the resulting compound, thereby preparing a polymer in powder form (rubber-modified vinyl-based graft copolymer having a core-shell structure).

TABLE 1

| | | | Preparative Example | | | | | | | |
|---|---|---|---|---|---|---|---|---|---|---|
| | | | 1 | 2 | 3 | 4 | 5 | 6 | 7 | 8 |
| Core | (a1) PBD | Average particle diameter (nm) | 245 | 310 | 245 | 310 | 310 | 310 | 310 | 310 |
| | | parts by weight | 100 | 100 | 100 | 100 | 100 | 100 | 100 | 100 |
| | (a2) SM (parts by weight) | | 45 | 52.5 | 38.8 | 45.3 | — | 45.3 | 45.3 | 45.3 |
| | (a3) AN (parts by weight) | | 15 | 17.5 | 12.9 | 15.1 | — | 15.1 | 15.1 | 15.1 |
| Total core (parts by weight) | | | 100 | 100 | 100 | 100 | 100 | 100 | 100 | 100 |
| Shell | (b1) AMS (wt %) | | 40 | 40 | 40 | 40 | 40 | — | 40 | — |
| | (b2) SM (wt %) | | 20 | 20 | 20 | 20 | 20 | 75 | 30 | 30 |
| | (b3) AN (wt %) | | 20 | 20 | 20 | 20 | 20 | 25 | 30 | 30 |
| | (b4) PMI (wt %) | | 20 | 20 | 20 | 20 | 20 | — | — | 40 |
| Total shell (parts by weight) | | | 140 | 130 | 140 | 130 | 100 | 130 | 130 | 130 |
| Conversion ratio | | | 94% | 93% | 96% | 95% | 91% | 95% | 65% | 95% |

Details of components used in Examples and Comparative Examples are as follows.

(A) Rubber-modified vinyl-based graft copolymer resin (A1) A rubber-modified vinyl-based graft copolymer resin of Preparative Example 1 was used.

(A2) A rubber-modified vinyl-based graft copolymer resin of Preparative Example 2 was used.

(A3) A rubber-modified vinyl-based graft copolymer resin of Preparative Example 3 was used.

(A4) A rubber-modified vinyl-based graft copolymer resin of Preparative Example 4 was used.

(A5) A rubber-modified vinyl-based graft copolymer resin of Preparative Example 5 was used.

(A6) A rubber-modified vinyl-based graft copolymer resin of Preparative Example 6 was used.

(A7) A rubber-modified vinyl-based graft copolymer resin of Preparative Example 7 was used.

(A8) A rubber-modified vinyl-based graft copolymer resin of Preparative Example 8 was used.

(B) Aromatic vinyl-based copolymer resin (B1) An aromatic vinyl-based copolymer resin (SAN) having a weight average molecular weight of 150,000 g/mol and prepared by suspension polymerization of a monomer mixture comprising 74 wt % of styrene and 26 wt % of acrylonitrile was used.

(B2) An aromatic vinyl-based copolymer resin (AMS-SAN) having a weight average molecular weight of 140,000 g/mol and prepared by suspension polymerization of a monomer mixture comprising 54 wt % of α-methylstyrene (AMS), 19 wt % of styrene and 27 wt % of acrylonitrile was used.

(B3) An aromatic vinyl-based copolymer resin (PMI-SAN, Product Name: MS-TI, Manufacturer: DENKA Co., Ltd.), which is a copolymer of N-phenyl maleimide (PMI), styrene and acrylonitrile, was used.

Examples 1 to 4 and Comparative Examples 1 to 3

100 parts by weight of the components ((A) and (B)) added in amounts as listed in Table 2, 0.1 parts by weight of an antioxidant (Product Name: Irganox 1076, Manufacturer: Ciba Chemical Inc.), and 0.3 parts by weight of a stabilizer (Magnesium stearate) were mixed for 10 minutes using a tumbler mixer. Then, the mixture was added to a twin-screw extruder (L/D=32, diameter: 45 mm), and subjected to melt-extrusion at a barrel temperature of 250° C. and a stirring rate of 250 rpm, thereby preparing pellets. The pellets were dried at 80° C. for 2 hours or more and injection-molded in an injection molding machine (LGH-140N, Manufacturer: LG Cable & System) at a cylinder temperature of 230° C., thereby preparing specimens. The prepared specimens were evaluated as to the following properties by the following method, and results are shown in Table 2.

Property Evaluation (1) Notched Izod impact strength (kgf·cm/cm): Notched Izod impact strength was measured on a ¼" thick notched specimen in accordance with ASTM D256.

(2) Melt-flow index (MI) (unit: g/10 min): Melt-flow index was measured at 220° C. and a load of 10 kg in accordance with ISO 1133.

(3) Vicat Softening Temperature (VST) (unit: ° C.) was measured under a load of 5 kg in accordance with ASTM D1525.

(4) Yellow index difference (ΔYI): A yellow index (YI0) of each of molded products produced by injection molding the pellets of the thermoplastic resin compositions prepared in Examples and Comparative Examples using an injection molding machine under a clamping force of 100 ton at a cylinder temperature of 250° C. was measured in accordance with ASTM D1925 (using a color computer measurement instrument from Suga Instrument Inc., Japan). Then, a yellow index (YI1) of each of molded products produced by injection molding the pellets of the thermoplastic resin compositions under the same conditions after leaving the pellets in the injection molding machine for 10 minutes was measured in accordance with ASTM D1925. Thereafter, a difference between the yellow indices (ΔYI=YI1−YI0) was calculated.

(5) Appearance evaluation of injection molded specimen: Five specimens each having a size of 100 mm×100 mm×3.2 mm were prepared by injection molding under conditions of a molding temperature of 320° C., a mold temperature of 70° C., and a cooling time of 120 seconds, followed by observation of defects (silver streak, pinhole, sand) on each of the specimens with the naked eye. Evaluation standards were as follows.

⊚: Very good external appearance (no pinholes and the like), ○: Good external appearance (less than five pinholes and the like), Δ: Poor external appearance (five or more pinholes and the like), x: Very poor external appearance (silver streak and the like)

TABLE 2

|  |  | Example | | | | | Comparative Example | | |
|---|---|---|---|---|---|---|---|---|---|
|  |  | 1 | 2 | 3 | 4 | 5 | 1 | 2 | 3 |
| (A) | (A1) | 24 | — | — | — | — | — | — | — |
| (wt %) | (A2) | — | 24 | — | — | — | — | — | — |
|  | (A3) | — | — | 24 | — | — | — | — | — |
|  | (A4) | — | — | — | 24 | — | — | — | — |
|  | (A5) | — | — | — | — | 24 | — | — | — |
|  | (A6) | — | — | — | — | — | 24 | — | — |
|  | (A7) | — | — | — | — | — | — | 24 | — |
|  | (A8) | — | — | — | — | — | — | — | 24 |
| (B) | (B1) | 40 | 40 | 40 | 40 | 40 | 40 | 40 | 40 |
| (wt %) | (B2) | 19 | 19 | 19 | 19 | 19 | 19 | 19 | 19 |
|  | (B3) | 17 | 17 | 17 | 17 | 17 | 17 | 17 | 17 |
| Notched Izod impact strength | | 22.2 | 22.6 | 23.0 | 23.3 | 20.5 | 18.5 | 15.0 | 18.3 |
| Melt-flow index | | 4.1 | 3.9 | 3.8 | 3.8 | 4.1 | 3.8 | 6.5 | 4.5 |
| Vicat softening temperature | | 113.3 | 112.9 | 112.5 | 112.4 | 112.9 | 112.4 | 108.1 | 113.5 |
| ΔYI | | 24.3 | 24.5 | 24.1 | 24.9 | 25.4 | 26.3 | 29.5 | 36.1 |
| Appearance Evaluation | | ⊚ | ⊚ | ⊚ | ⊚ | ⊚ | Δ | Δ | X |

From the results, it could be seen that the thermoplastic resin compositions comprising the rubber-modified vinyl-based graft copolymers (Preparative Examples 1 to 5) according to the present invention exhibited good properties in terms of impact resistance, flowability (moldability), thermal resistance, discoloration resistance (weather resistance), external appearance, and the like.

On the contrary, the thermoplastic resin composition (Comparative Example 1), which was prepared using the rubber-modified vinyl-based graft copolymer (Preparative Example 6) not comprising the alpha position-substituted aromatic vinyl-based monomer and the maleimide-based monomer as the shell components, exhibited deterioration in impact resistance, external appearance, and the like; the thermoplastic resin composition (Comparative Example 2), which was prepared using the rubber-modified vinyl-based graft copolymer (Preparative Example 7) not comprising the maleimide-based monomer as the shell component, exhibited deterioration in impact resistance, thermal resistance, discoloration resistance, external appearance, and the like; and the thermoplastic resin composition (Comparative Example 3), which was prepared using the rubber-modified vinyl-based graft copolymer (Preparative Example 8) not comprising the alpha position-substituted aromatic vinyl-based monomer as the shell component, exhibited deterioration in impact resistance, discoloration resistance, external appearance, and the like.

It should be understood that various modifications, changes, alterations, and equivalent embodiments can be made by those skilled in the art without departing from the spirit and scope of the invention.

The invention claimed is:

1. A thermoplastic resin composition comprising:
a rubber-modified vinyl-based graft copolymer having a core-shell structure, in which a shell is formed by graft polymerization of a monomer mixture to a core comprising a rubber polymer,
wherein the monomer mixture comprises about 30 wt % to about 80 wt % of an aromatic monomer comprising an alpha position-substituted aromatic vinyl-based monomer represented by Formula 1 and an aromatic vinyl-based monomer other than the alpha position-substituted aromatic vinyl-based monomer, wherein the alpha position-substituted aromatic vinyl-based monomer and the aromatic vinyl-based monomer other than the alpha position-substituted aromatic vinyl-based monomer are present in a weight ratio of about 0.5:1 to about 5:1; about 10 wt % to about 30 wt % of a vinyl cyanide-based monomer; and about 10 wt % to about 30 wt % of a maleimide-based monomer:

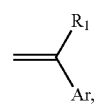

[Formula 1]

wherein $R_1$ is a $C_1$ to $C_5$ alkyl group and Ar is a substituted or unsubstituted $C_6$ to $C_{20}$ aryl group or a substituted or unsubstituted $C_7$ to $C_{20}$ alkylaryl group; and
an aromatic vinyl-based copolymer resin,
wherein the thermoplastic resin composition has an Izod impact strength of about 20 kgf·cm/cm to about 40 kgf·cm/cm, as measured on a ¼" thick specimen in accordance with ASTM D256, a melt-flow index of about 3 g/10 min to about 5 g/10 min, as measured at 200° C. under a load of 10 kg in accordance with ISO 1133, and a Vicat softening temperature (VST) of about 110° C. to about 130° C., as measured under a load of 5 kg in accordance with ASTM D1525.

2. The thermoplastic resin composition according to claim 1, wherein the thermoplastic resin composition comprises about 10 wt % to about 40 wt % of the rubber-modified vinyl-based graft copolymer and about 60 wt % to about 90 wt % of the aromatic vinyl-based copolymer resin.

3. The thermoplastic resin composition according to claim 1, wherein the aromatic vinyl-based copolymer resin comprises a copolymer of an aromatic monomer and a vinyl cyanide-based monomer; a copolymer of a vinyl cyanide-based monomer and an aromatic monomer comprising an alpha position-substituted aromatic vinyl-based monomer and an aromatic vinyl-based monomer other than the alpha position-substituted aromatic vinyl-based monomer; and/or a copolymer of an aromatic monomer, a vinyl cyanide-based monomer, and a maleimide-based monomer.

4. The thermoplastic resin composition according to claim 1, wherein the rubber-modified vinyl-based graft copolymer is prepared by graft copolymerization of about 60 to about 160 parts by weight of the shell relative to about 100 parts by weight of the core.

5. The thermoplastic resin composition according to claim 1, wherein the rubber polymer of the rubber-modified vinyl-based graft copolymer has an average particle diameter of about 200 nm to about 400 nm.

6. The thermoplastic resin composition according to claim 1, wherein the core of the rubber-modified vinyl-based graft copolymer is formed by polymerization of an aromatic monomer and a vinyl cyanide-based monomer swollen into the rubber polymer.

7. The thermoplastic resin composition according to claim 6, wherein the wherein the core is formed by polymerization of about 10 to about 110 parts by weight of the aromatic monomer and the vinyl cyanide-based monomer relative to about 100 parts by weight of the rubber polymer, and the aromatic monomer and the vinyl cyanide-based monomer are present in a weight ratio of about 1.5:1 to about 4:1.

8. The thermoplastic resin composition according to claim 1, wherein the maleimide-based monomer comprises a compound represented by Formula 2:

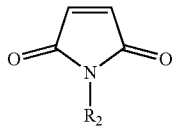

[Formula 2]

wherein $R_2$ is a $C_1$ to $C_{20}$ hydrocarbon group.

* * * * *